US00RE43104E

(19) United States
(12) Reissued Patent
Rica

(10) Patent Number: US RE43,104 E
(45) Date of Reissued Patent: Jan. 17, 2012

(54) BOTTLE

(75) Inventor: Didier Rica, Le Mont Saint Adrien (FR)

(73) Assignee: Saverglass, Inc., Ramsey, NJ (US)

() Term: 14 Years**

(21) Appl. No.: 29/333,210

(22) Filed: Mar. 4, 2009

Related U.S. Patent Documents

Reissue of:
(64) Patent No.: Des. 564,883
Issued: Mar. 25, 2008
Appl. No.: 29/266,361
Filed: Sep. 20, 2006

(30) Foreign Application Priority Data

Mar. 21, 2006 (EM) ..... 000498878-0001

(51) LOC (9) Cl. ..... 09-01
(52) U.S. Cl. ..... D9/520
(58) Field of Classification Search ..... D7/302; D9/500, 503, 505, 516, 544–545, 549, 551, D9/554, 558, 564, 567, 652, 682, 686, 688–692, D9/520, 522, 552, 693; 215/379–383; 220/660–662, 669–675
See application file for complete search history.

(56) References Cited

U.S. PATENT DOCUMENTS

D117,305 S * 10/1939 Paris ..... D9/558
D249,636 S * 9/1978 Wolstenholme ..... D9/500
D303,498 S * 9/1989 Cruse ..... D7/302
D330,327 S * 10/1992 Messer ..... D9/500
D434,985 S * 12/2000 Colonna ..... D9/516

FOREIGN PATENT DOCUMENTS

WO DM/047321 * 1/1999
WO DM/047550 * 4/1999
WO DM/048811 * 5/1999
WO DM/052705 * 7/2000
WO DM/062751 * 3/2002

* cited by examiner

*Primary Examiner* — George D Kirschbaum

(57) CLAIM

The ornamental design for a bottle, as shown *and described.*

DESCRIPTION

[FIG. 1 is a side elevational view of a bottle showing my new design;]
[FIG. 2 is a top plan view thereof; and,]
[FIG. 3 is a bottom plan view thereof.]
*FIG. 4 is a perspective view of a bottle showing my new design;*
*FIG. 5 is a front view thereof;*
*FIG. 6 is a rear view thereof;*
*FIG. 7 is a top plan view thereof; and,*
*FIG. 8 is a bottom plan view thereof.*
[The broken line(s) define the bounds of the claim and form no part thereof.]

1 Claim, 4 Drawing Sheets

Figure 1:
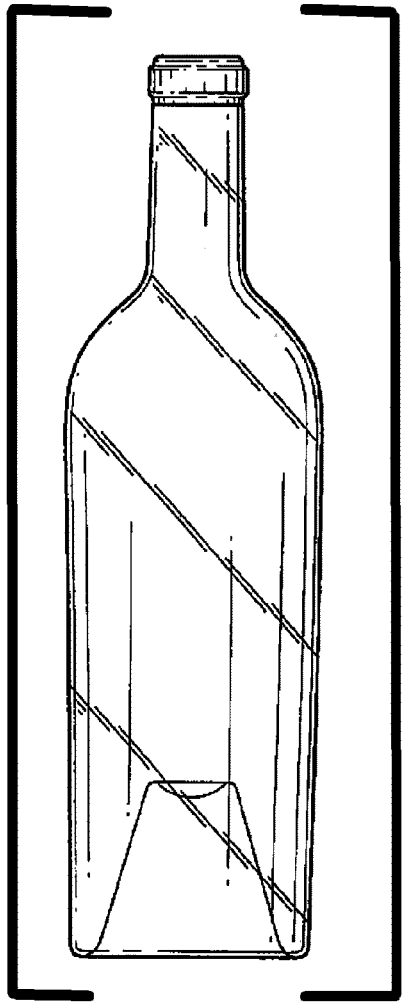
Figure 2:
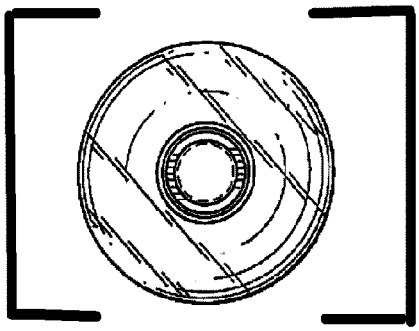
Figure 3:
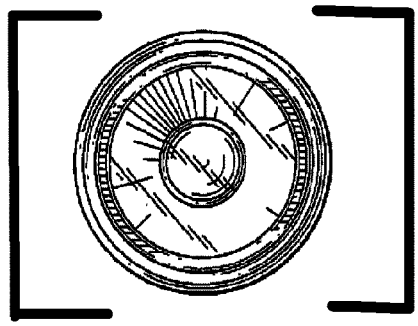

Matter enclosed in heavy brackets [ ] appears in the original patent, but forms no part of this reissue; matter printed in italics indicates the additions made by reissue.

(NEW) (NEW)

(CANCELED)

(CANCELED)

(CANCELED)

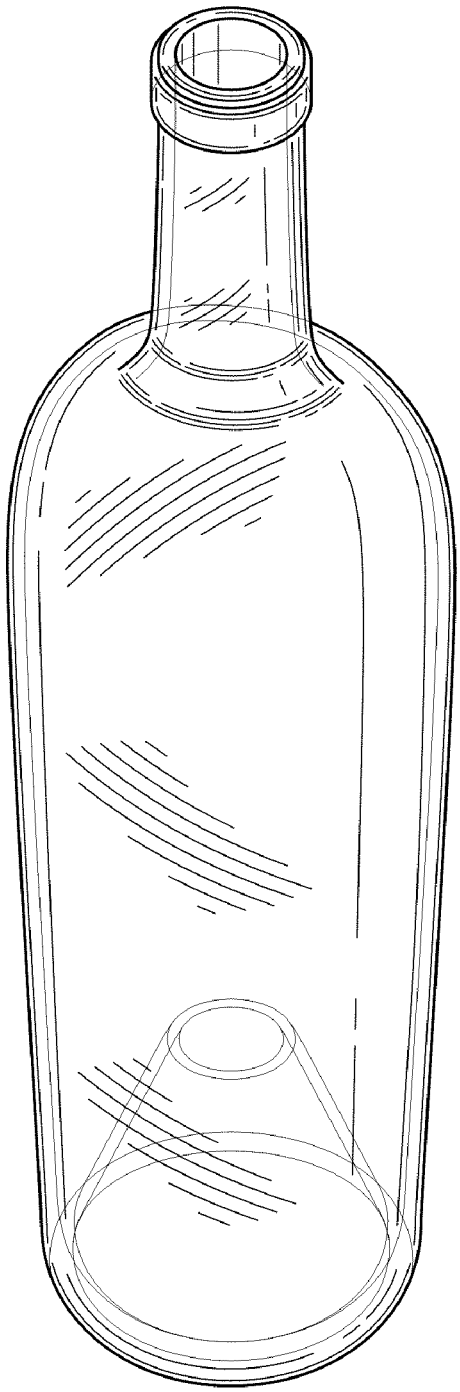
FIG. 4 (NEW)

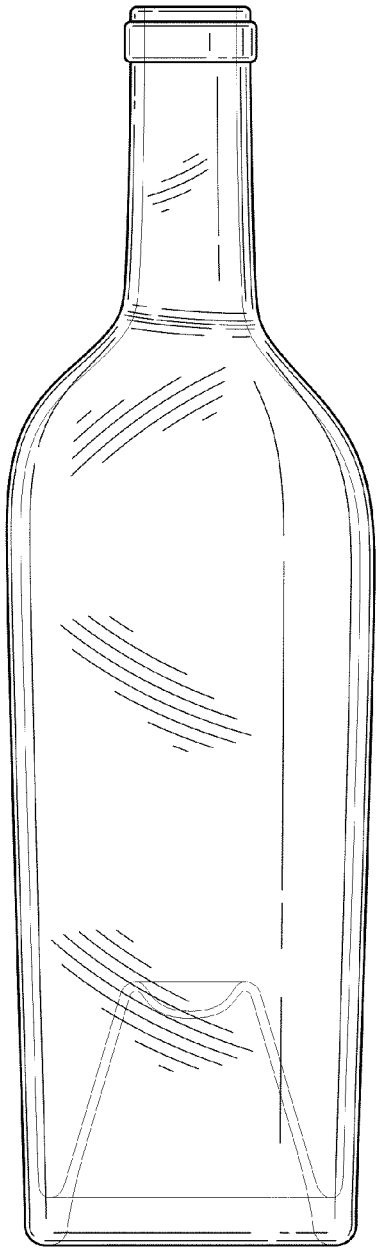
FIG. 5 (NEW)
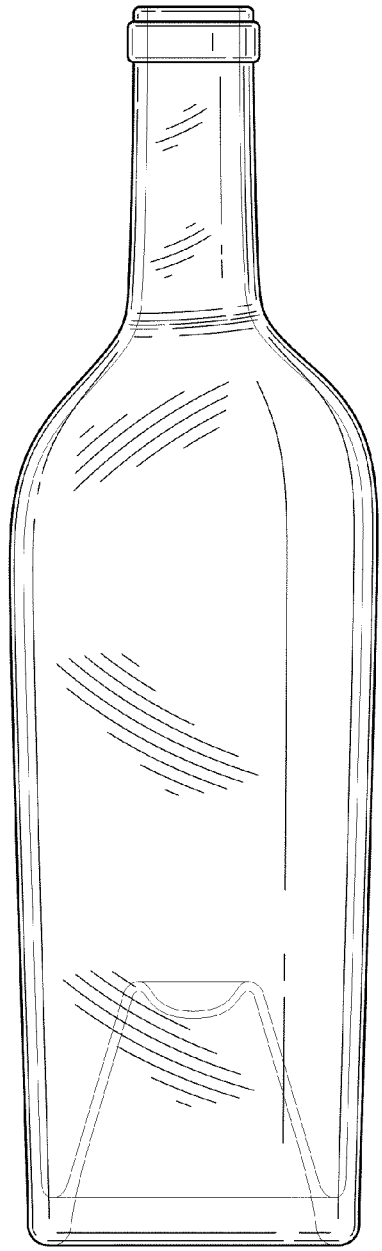
FIG. 6 (NEW)

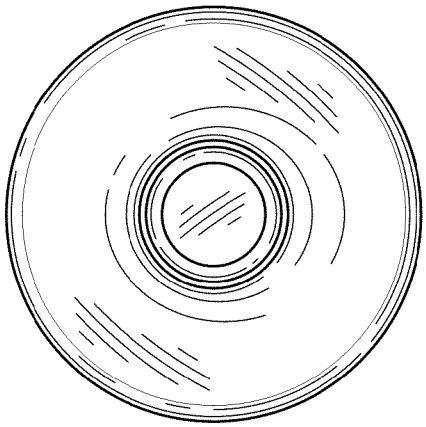
FIG. 7 (NEW)
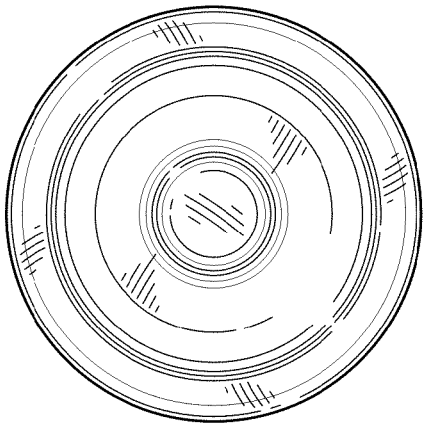
FIG. 8 (NEW)